Nov. 11, 1969   H. E. SCHALLER   3,477,674
VIBRATION DAMPING PAD
Filed Nov. 24, 1967

INVENTOR.
HAROLD E. SCHALLER
BY
Joseph P. Gastel
ATTORNEY.

United States Patent Office 3,477,674
Patented Nov. 11, 1969

3,477,674
VIBRATION DAMPING PAD
Harold E. Schaller, East Aurora, N.Y., assignor to John E. Smith's Sons Co., Division of Hobam, Inc., Buffalo, N.Y., a corporation of New York
Filed Nov. 24, 1967, Ser. No. 685,460
Int. Cl. F16f 15/04
U.S. Cl. 248—24                      2 Claims

ABSTRACT OF THE DISCLOSURE

A vibration damping pad consisting of a substantially frustoconical body member of neoprene rubber having a circular metallic plate embedded in each of its upper and lower bases, with each plate being bordered by a ring of the material of the body member to aid in holding each plate in position, the upper plate mounting a nut on its underside for removably receiving a stud which is attachable to the leg of a machine or the like, and the ring formed about the lower plate tending to deform into anti-creep engaging contact with the surface on which the pad is mounted as a result of bearing the weight of the machine.

BACKGROUND OF THE INVENTION

The present invention relates to an improved vibration pad of the type on which each leg of a heavy machine or the like is mounted for the purpose of damping vibration and preventing creep of the machine.

Vibration damping pads have been used in the past for supporting the legs of machines which are subject to vibration. However, these pads possessed certain shortcomings. For example, one type of pad was able to provide good vibration dampening but could not support heavy loads because of its relatively lightweight construction. Another type which could expediently dampen the vibration of heavy loads did not have an anti-creep quality, thereby necessitating that it be anchored to a supporting surface. It is with an improved vibration pad for supporting the legs of a heavy vibrating machine which overcomes the foregoing shortcomings that the present invention is concerned.

SUMMARY OF THE INVENTION

It is accordingly one object of the present invention to provide an improved vibration pad which can dampen the vibration of a relatively heavy machine and which also prevents the machine from creeping, without requiring that the vibration pad be anchored in any way to a supporting surface.

Another object of the present invention is to provide an improved vibration pad in which an upwardly extending stud which attaches to the leg of the machine can be secured to the pad after the leg is in position on the pad, thereby obviating the necessity for lifting the leg to a higher elevation than the top of the pad during the process of mounting the leg on the pad.

A further object of the present invention is to provide an improved vibration pad which is capable of both damp- ening the vibration of a heavy machine and preventing creep thereof, while being of a relatively simple construction. Other objects and attendant advantages of the present invention will be perceived readily hereafter.

The improved vibration pad of the present invention includes a substantially frustoconical body member of neoprene rubber or the like having a circular metallic plate embedded in its upper base for the purpose of removably receiving a stud which attaches to a leg of a machine, the stud being threaded for mating engagement with a tapped portion of the upper plate. A second circular plate is embedded in the lower base of the frusto- conical body member so that the major portion of the body member is sandwiched between the first and second plates and this portion is placed in compression as a result of carrying the load of a machine. An upper ring of material from the body member borders the upper plate to tend to prevent lateral shifting thereof and a lower ring formed from the body member borders the outer peripheral edge of the lower circular plate. The lower ring serves the primary function of deforming into gripping contact with the supporting surface on which the pad is mounted when the pad carries the load of a machine, thereby providing an anti-creep function without requiring the pad to be anchored.

The present invention will be more fully understood when the following portions of the specification are read in conjunction with the accompanying drawings wherein:

DESCRIPTION OF THE PREFERRED EMBODIMENTS

Figure 1:
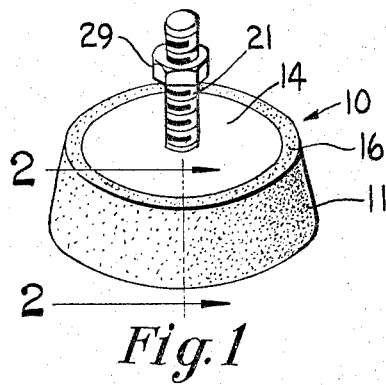
FIGURE 1 is a perspective view of the improved vibration pad of the present invention.

The improved vibration pad 10 of the present invention includes a substantially solid frustoconical body member 11 of neoprene rubber or the like having an upper base 12 and a lower base 13. A circular plate 14 is essentially embedded in upper base 12 of body member 11, which forms an annular ring 16 bordering plate 14. Upper plate 14 includes a nut 17 secured to the undersurface 18 thereof by weld 19, nut 17 being concentric with aperture 20 located at the center of plate 14. Nut 17 and aperture 20 are both tapped to removably receive threaded stud 21. Plate 14 and nut 17 are received in complementary mating relationship in a correspondingly shaped depression of body member 11. This construction restricts plate 14 against lateral movement relative to body member 11. It readily can be seen that plate 14 serves the function of distributing the load of a leg of a machine or the like carried by stud 21 across substantially the entire upper surface of body member 11.

Figure 2:
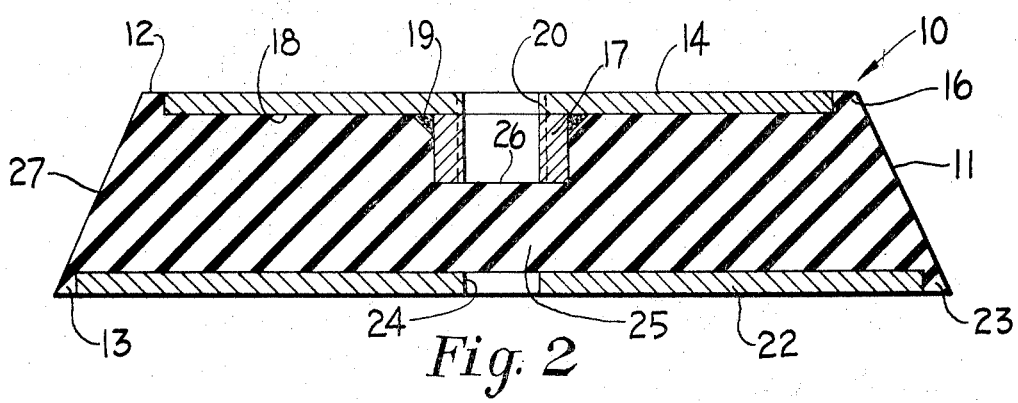
FIGURE 2 is a cross sectional view taken substantially along line 2—2 of FIGURE 1 with certain parts omitted.

A circular lower plate 22 is embedded in the lower base of frustoconical body member 11. Circular plate 22 is bordered by a ring 23 formed from the body member 11. As can be seen from FIGURE 2, rim 23 tends to prevent lateral movement of plate 22 relative to body member 11. Plate 22 distributes the load applied to pad 10 over the surface 28 on which the pad rests.

The body member 11 is molded integrally with plates 14 and 22 and thereafter the rubber is vulcanized at a suitably high temperature which not only imparts the desired characteristics to the body member, but also bonds it to the surfaces of said plates. Plates 14 and 22 therefore reinforce the body member against lateral shearing forces.

A central aperture 24 is provided in plate 22 in alignment with nut 17. This aperture permits the central portion 25 of body member 11 lying between nut 17 and aperture 24 to move into said aperture in the event of distortion. Therefore portion 25 of the body member can yield freely when subjected to fluctuating loads, and, further, if for any reason stud 21 is threaded into nut 17 so that it presses against surface 26 of the body member, the portion 25 immediately below surface 26 will be able to deflect into aperture 24. In this way aperture 24 acts to relieve any compressive force applied to the portion 25 of body member 11.

Figure 3:
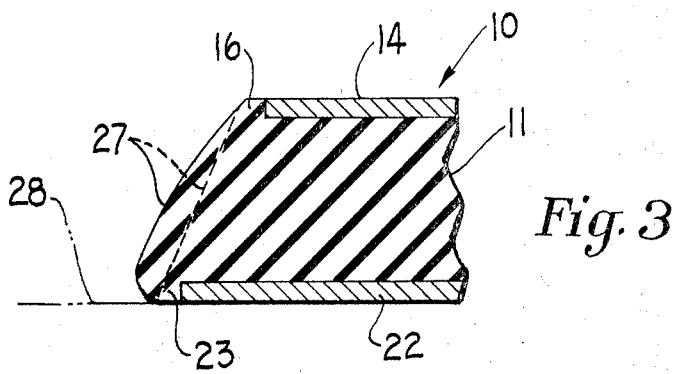
FIGURE 3 is a fragmentary cross sectional view similar to FIGURE 2 but showing the shape which the outer edge of the vibration pad assumes when carrying a load.

When the vibration pad 10 is subjected to a vibrating load, the body member 11 will dampen such vibrations. It is to be noted from FIGURE 3 that when the vibration pad 10 carries a load, the outer edge 27 will deform from its dotted line position shown in FIGURE 3 to its solid line position. This will cause a greater portion of rim 23 to contact the supporting surface 28 on which vibration pad 10 rests to provide a greater force resisting creep thereby permitting a pad 10 to support the leg of a machine against lateral movement without being anchored to the supporting surface 28.

It is to be especially noted that the machine leg which is supported on vibration pad 10 need not be lifted an excessive distance in order to mount it on pad 10. In this respect, the stud 21 can be unscrewed from nut 17 and the leg can be placed in position on plate 14 with a suitable aperture in said leg overlying aperture 20. Thereafter, stud 21 can be inserted through the aperture in said leg and threaded into nut 17. To complete the assembly, upper nut 29 is tightened down onto a portion of the leg held between the upper surface of plate 14 and the lower surface of the nut 29. It will be appreciated that if it is desired to adjust the elevation of a leg held on stud 21, two nuts such as 29 can be threaded onto stud 21 on opposite sides of the leg, that is, one nut is located between a portion of the leg and plate 14 and the other nut is placed over the leg so that the leg occupies a position between the two nuts. In this manner by adjsuting the positions of the two spaced nuts 29 on stud 21, the elevation of the particular leg located between the two nuts 21 can be varied to provide suitable leveling. In addition, it is to be especially noted that stud 21 can be rigidly secured to nut 17 from a position above plate 14, that is, access need not be had to the underside of vibration pad 10 for the purpose of inserting or removing stud 21.

While preferred embodiments of the present invention have been disclosed it will be appreciated that it is not limited thereto but may be otherwise embodied within the scope of the invention.

I claim:

1. A vibration damping pad comprising a body member of resilient deformable material having an upper surface and a lower surface, a first plate mounted against lateral displacement on said upper surface of said body member, attachment means secured to said first plate for carrying a load whereby said first plate distributes said load substantially across the top of said resilient body member, a second plate having an outer periphery mounted across substantially said entire lower surface for bearing on a supporting surface whereby said load is distributed to said supporting surface substantially across said second plate, a relatively thin border of said resilient body member surrounding said outer periphery of said second plate for bearing on said supporting surface when said resilient body member is deformed as a result of carrying said load to thereby provide an adhering force on said supporting surface for tending to prevent creep of said pad, said attachment means comprising nut means secured to the underside of said first plate for receiving a threaded stud with said nut means being received in a mating depression in said resilient body member, and said resilient body member being solid throughout a substantial portion of its cross section below said nut means, and a relatively small aperture in said second plate in alignment with said nut means for relieving any stress in said resilient body member under said nut means.

2. A pad assembly as set forth in claim 1 wherein said resilient body member is of substantially frustoconical configuration, and wherein both said first plate and said second plate are of substantially planar circular configuration, and wherein said relatively thin border comprises an annular ring.

References Cited

UNITED STATES PATENTS

| | | | |
|---|---|---|---|
| 2,739,774 | 3/1956 | Crede | 248—24 |
| 2,893,665 | 7/1959 | Paulsen | 248—24 |

ROY D. FRAZIER, Primary Examiner

J. FRANKLIN FOSS, Assistant Examiner

U.S. Cl. X.R.

248—20, 358; 267—1